United States Patent [19]

Nishida

[11] Patent Number: 5,117,931
[45] Date of Patent: Jun. 2, 1992

[54] VEHICLE POWER TRANSMISSION APPARATUS HAVING AN ENGINE STARTING FUNCTION

[75] Inventor: Minoru Nishida, Amagasaki, Japan
[73] Assignee: Mitsubishi Denki K.K., Tokyo, Japan
[21] Appl. No.: 645,532
[22] Filed: Jan. 24, 1991

[30] Foreign Application Priority Data

Jan. 26, 1990 [JP] Japan .................................. 2-14884
May 22, 1990 [JP] Japan .................................. 2-130242

[51] Int. Cl.⁵ .......................................... F02N 11/04
[52] U.S. Cl. ....................................... 180/65.2; 290/46
[58] Field of Search .............. 123/179 D; 290/31, 32, 290/47, 38 R, 46; 180/65.1, 65.2, 65.3; 322/10, 11, 12

[56] References Cited

U.S. PATENT DOCUMENTS

| | | | |
|---|---|---|---|
| 1,726,760 | 9/1929 | Otwell | 123/179 D |
| 2,887,100 | 5/1959 | Papst | 123/179 D |
| 2,930,259 | 3/1960 | Riedel | 123/179 D |
| 4,401,938 | 8/1983 | Cronin | 290/38 R X |
| 4,481,459 | 11/1984 | Mehl et al. | 290/38 R X |
| 4,699,097 | 10/1987 | Tanaka et al. | 123/179 D X |
| 4,743,777 | 5/1988 | Shilling et al. | 290/46 |
| 4,772,802 | 9/1988 | Glennon et al. | 290/31 |
| 4,862,027 | 8/1989 | Isozumi et al. | |
| 4,883,973 | 11/1989 | Lakey et al. | 290/31 |
| 4,948,997 | 8/1990 | Ohmitsu et al. | 290/38 R X |
| 5,028,803 | 7/1991 | Reynolds | 290/46 X |

FOREIGN PATENT DOCUMENTS 277499 11/1988 Japan .

OTHER PUBLICATIONS

SAE Paper No. 710235—An Electrsmechanical Transmission for Hybrid Vehicle Power Trains—Design and Dynamometer Testing, Jan. 1971.

Primary Examiner—Andres Kashnikow
Assistant Examiner—Michael Mar
Attorney, Agent. or Firm—Sughrue, Mion, Zinn, Macpeak & Seas

[57] ABSTRACT

A vehicle power transmission apparatus having an engine starting function is provided which is small in size and has a high degree of freedom and accuracy in controlling torque transmission. The apparatus comprises torque transmitting means including a differential gear mechanism and having at least three (first through third) rotation shafts; an engine operatively connected with the first rotation shaft of the torque transmitting means; a transmission connected with the second rotation shaft for transmitting torque to a drive shaft of the vehicle; an electric motor connected with the third shaft of the torque transmitting means; a power transducer for controlling the electric motor; an electric power source for supplying power to the electric motor through the power transducer; and a controller for controlling the power transducer in such a manner that the electric motor operates as a power source or a load in dependence upon the operating condition of the vehicle.

4 Claims, 4 Drawing Sheets

VEHICLE POWER TRANSMISSION APPARATUS HAVING AN ENGINE STARTING FUNCTION

BACKGROUND OF THE INVENTION

The present invention relates to a power transmission apparatus for a vehicle, and more particularly, to such a power transmission apparatus having an engine starting function which is compact in size and has a high degree of freedom and accuracy in controlling the transmission of engine torque.

Many power transmission apparatuses for vehicles have hitherto been proposed which have not only a speed-changing function but also a vehicle starting-off function. All of the conventional power transmission apparatuses have the following drawbacks. Specifically, in the case of a manually operated gear transmission with a driver-operated clutch for example, when starting off the vehicle or when the gears are changed, the clutch in the transmission is completely connected or engaged only after passing through a partially connected or engaged state which lasts for about one to five seconds. Specifically, during the gear changing operation, the driver operates the clutch pedal in synchronization with the manipulation of a shift lever for changing the gears so as to interrupt the operative connection between the output shaft of the engine and the input shaft of the transmission. In the course of such disconnection or disengagement, the driver manipulates the shift lever into a desired gear and thereafter again operates the clutch pedal so as to re-establish connection or engagement between the engine output shaft and the transmission input shaft. At this time, it is necessary for the driver to connect or engage the clutch for the purpose of preventing the generation of torque shock or torque fluctuations. Such clutch operation requires considerable skill on the part of the driver.

Moreover, if the driver is forced to repeatedly perform such clutch pedal operations, he or she may become fatigued making it difficult for the driver to perform proper clutch pedal operation at all times. As a result, the power transmission system requires extra or additional torque transmission capacity in order to avoid impairment or damage thereto due to great torque fluctuations.

Moreover, in manual transmissions where the driver has to manually operate the clutch pedal and the shift lever, there will be an attendant energy loss due to sliding friction between partially engaged clutch members.

Conversely, in the case of a hydraulic torque converter having a constantly engaged gear transmission hydraulically operated to change gears in an automatic manner, when the vehicle is started off from a standstill, engine torque is gradually transmitted between the input and output members of the torque converter through the intermediary of a fluid such as hydraulic oil. Thus, clutch operations are automatic and no manual operation on the part of the driver is necessary. Nonetheless, instead of the driver's clutch pedal operation, etc., a hydraulic circuit including a hydraulic pump is required so that the entire apparatus becomes large in size and complicated in construction, while energy loss from circulating the hydraulic fluid, sliding loss in the hydraulic converter and the like is great.

Moreover, with the above-described conventional apparatuses, a starter motor and a starter clutch for starting the engine are required independently of and in addition to the power transmission apparatus, thus reducing space efficiency.

SUMMARY OF THE INVENTION

The present invention is intended to obviate the above-described various problems of conventional transmission apparatuses.

An object of the present invention is to provide a novel and improved vehicle power transmission apparatus having an engine starting function which is small in size and has a high degree of freedom and accuracy in controlling torque transmission.

In order to achieve this objective, the present invention includes a vehicle power transmission apparatus having a starter function which comprises:

torque transmitting means including a differential gear mechanism and having at least a first, a second and a third rotation shaft;

an engine operatively connected with the first rotation shaft of the torque transmitting means;

a transmission connected with the second rotation shaft for transmitting torque to a drive shaft of the vehicle;

an electric motor connected with the third shaft of the torque transmitting means;

a power transducer for controlling the electric motor;

an electric power source for supplying power to the electric motor through the power transducer; and a controller for controlling the power transducer so that the electric motor operates as a power source or a generator in dependence upon the operating condition of the vehicle.

With the power transmission apparatus as constructed above, the electric motor is energized to operate with the transmission locked up in an engine starting period, so as to rotate the crankshaft of the engine through the intermediary of the differential gear mechanism. After the end of the engine starting operation, the electric motor mainly acts as a generator so that the load torque of the electric motor is transmitted through the differential gear mechanism to the transmission as a reaction torque. At this time, the controller controls the power transducer so as to properly change the load torque of the electric motor, thus controlling the application of torque from the engine to the transmission via the differential.

The controller controls the power transducer so as to operate the electric motor as a starter motor for starting the engine when the second rotation shaft of the power transmitting means is locked against rotation and the engine is being started.

The transmission has a plurality of operational positions, and the controller controls the power transducer in such a manner that the torque of the electric motor varies in synchronization with a change in the operational position of the transmission to perform an on-off control on the application of torque from the engine to the transmission via the differential. Accordingly, it is possible to attain an extremely smooth gear changing operation with very limited torque variation.

Such objectives, features and advantages of the present invention will become more readily apparent from the detailed description of a few preferred embodiments of the invention with reference to the accompanying drawings.

DESCRIPTION OF THE PREFERRED EMBODIMENTS

The present invention will now be described in detail with reference to a few preferred embodiments thereof as illustrated in the accompanying drawings.

Figure 1:
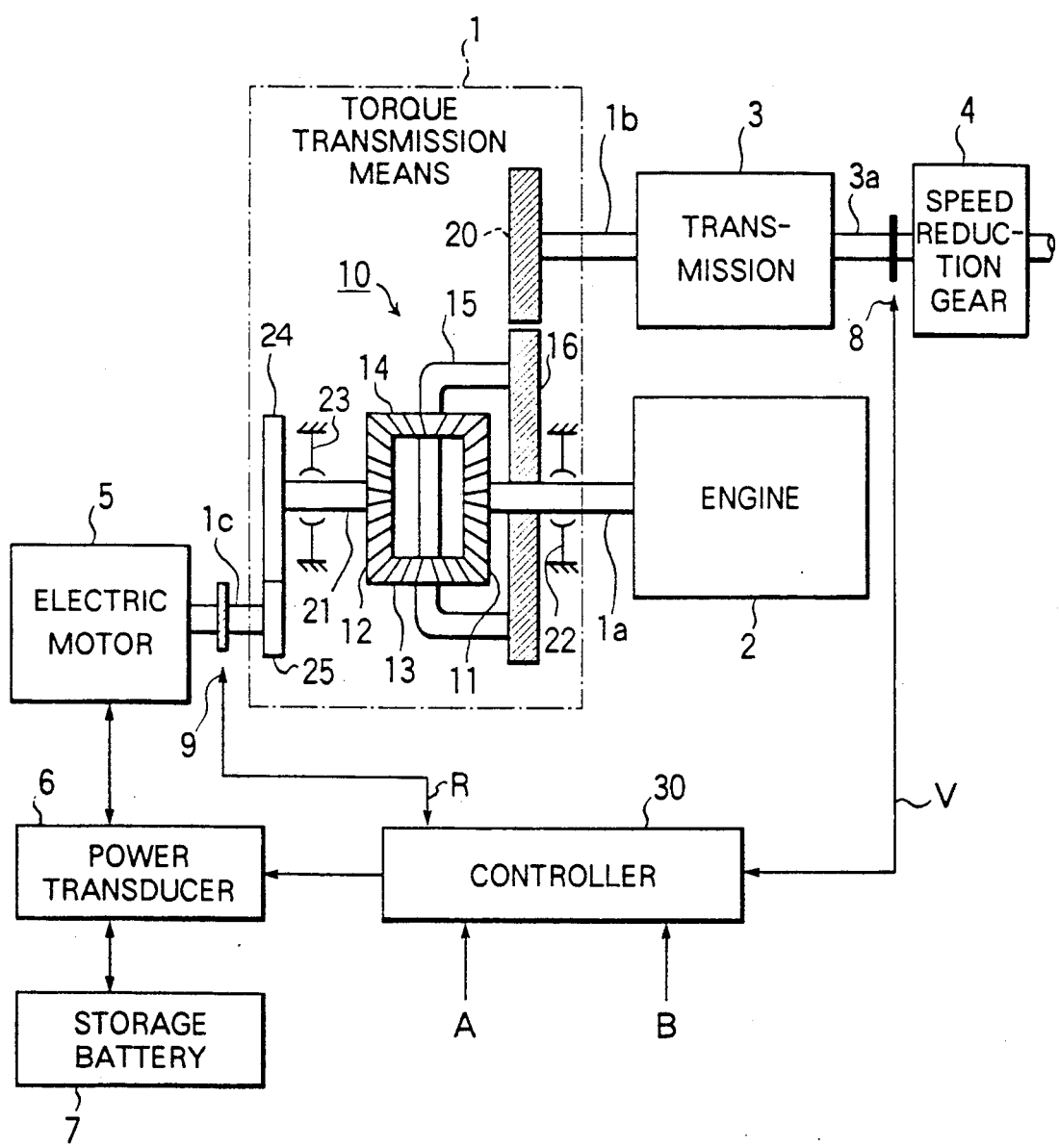
FIG. 1 is a schematic block diagram of the general arrangement of a vehicle power transmission apparatus having an engine starting function in accordance with the present invention.

Referring first to FIG. 1, there is diagrammatically shown a power transmission apparatus for a vehicle in accordance with the present invention. The illustrated apparatus includes a torque transmission means 1 having first through third rotation shafts 1a -3a and a well-known differential gear mechanism 10.

The differential gear mechanism 10 includes a pair of side gears 11, 12 in the form of bevel gears disposed in a spaced parallel relation with each other, the side gear 11 being connected with the first rotation shaft 1a for integral rotation therewith, a pair of pinion gears 13, 14 in the form of bevel gears disposed in a spaced parallel relation with each other at locations between the side gears 11, 12 and each being in meshing engagement with the side gears 11, 12, a U-shaped pinion shaft 15 for rotatably supporting the pinion gears 13, 14, and a large-diameter drive gear wheel 16 rotatably mounted on the first rotation shaft 1a which is operatively connected with the output shaft of the engine 2, the gear wheel 16 having one side surface to which the opposite ends of the U-shaped pinion shaft 15 are fixedly secured.

The torque transmission means 1 includes a small-diameter driven gear wheel 20 operatively connected with the second rotation shaft 1b and in meshing engagement with the large-diameter drive gear wheel 16, a shaft 21 fixedly secured to one side surface of the side gear 12, a bearing 22 rotatably supporting the first rotation shaft 1a, a bearing 23 for rotatably supporting the shaft 21, a large-diameter drive gear wheel 24 fixedly connected with the shaft 23 for rotation therewith, and a small-diameter driven gear 25 fixedly connected with the third shaft 1c and in meshing engagement with the large-diameter drive gear wheel 24. The drive and driven gear wheels 16, 20 constitute a speed reduction mechanism for the second rotation shaft 1b, and the drive and driven gear wheels 24, 25 constitute a speed reduction mechanism for the third shaft 1c.

An engine 2 which propels the vehicle has a crank shaft (not shown) operatively connected with the first rotation shaft 1a. A transmission 3 has an output shaft 3a operatively connected with the second rotation shaft 1b in such a manner that a rotative force or torque of the second shaft 1b is variably transmitted through the transmission 3 to the output shaft 3a in accordance with an operating position of a shift lever (not shown). A speed reduction gear 4 is connected with the output shaft 3a of the transmission 3 and has an output shaft which is operatively connected with drive wheels (not shown) of the vehicle.

An electric motor 5 is operatively connected with the rotation shaft 1c and is controlled by a power transducer 6 in such a manner that it is either connected to a storage battery 7 so as to be powered thereby or disconnected therefrom so as to function as a load for the engine 2.

In this manner, the engine 2, the transmission 3 and the electric motor 5 are operatively connected with each other through the intermediary of the differential gear mechanism 10.

A speed sensor 8 is provided on the output shaft 3a of the transmission 3 for sensing the rotational speed V of the output shaft 3a and for which V is representative of the speed of the vehicle. The rotational speed V of the output shaft 3a indirectly indicates the travelling condition of the vehicle. An angle sensor 9 is provided on the third rotation shaft 1c, which is operatively connected with the output shaft of the electric motor 5 for sensing the angle of rotation R of the rotation shaft 1c. For example, the angle sensor 9 comprises, though it is not illustrated, a disk having a plurality of combined teeth formed on the outer periperal surface thereof and an electromagnetic pickup disposed in the vicinity of the outer peripheral surface of the disk for generating a pulse signal in synchronization with the rotation of the disk.

A controller 30 controls the power transducer 6 so that the transducer 6 causes the electric motor 5 to function as a power source or a load in response to operational instructions (i.e., engine-starting instruction A or vehicle starting-off instruction B) of the driver, the rotational speed V of the output shaft 3a (i.e., the travelling condition of the vehicle) and the angle of rotation R of the rotation shaft 1c. The engine-starting instruction A is generated when the driver turns on a key switch (not shown); the vehicle starting-off instruction B is generated when the driver steps on an accelerator pedal (not shown).

Figure 2:
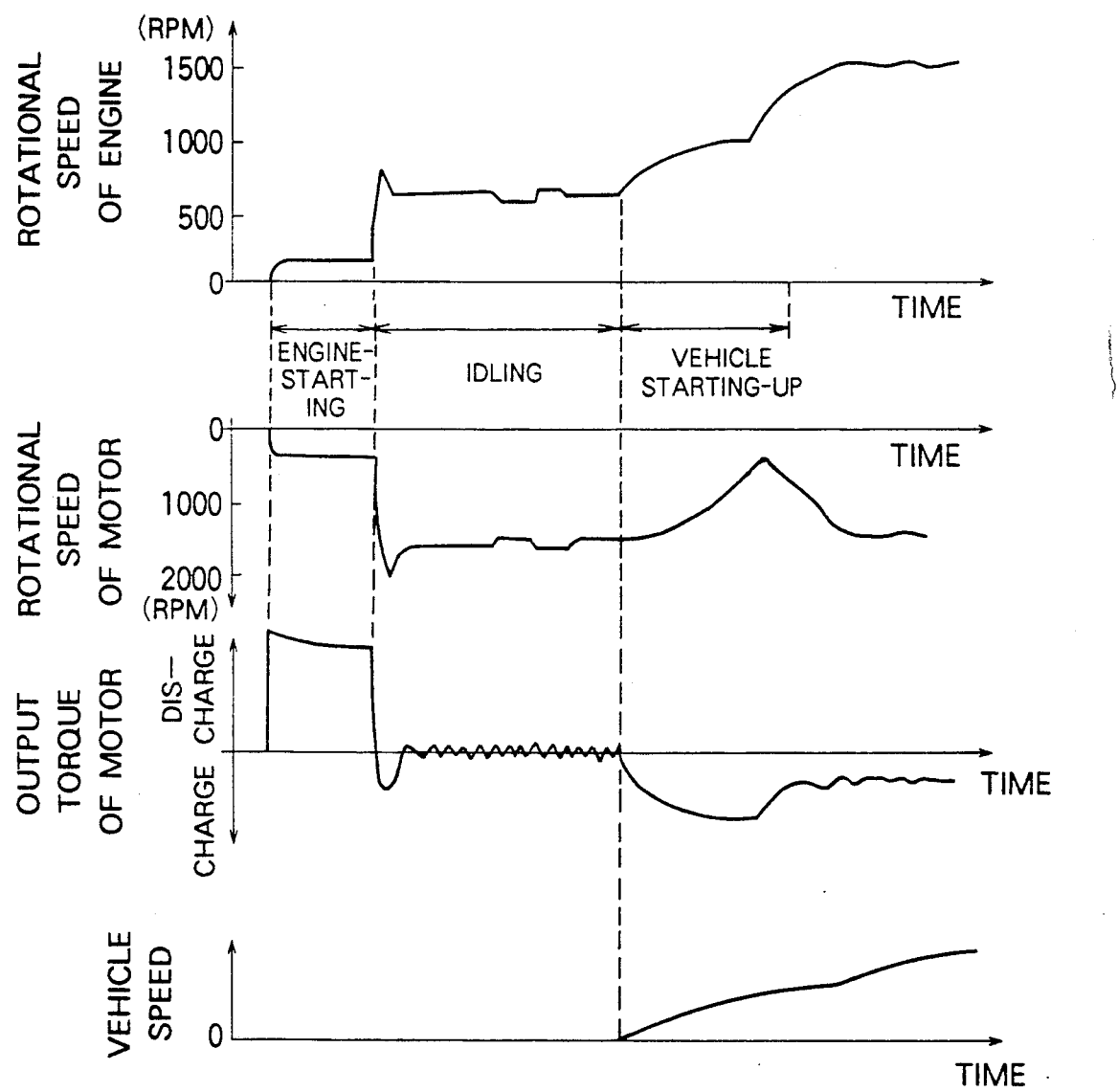
FIG. 2 is a wave form diagram showing the operation of the apparatus of FIG. 1.

FIG. 2 diagrammatically shows the wave forms of the engine speed signal, the motor speed signal and the motor torque signal which are a function of time beginning from the time of engine starting, through idling operation, to the time the vehicle begin to move.

Next, the operation of the above-described embodiment of FIG. 1 will be described with further reference to FIG. 2. Under normal running conditions, the electric motor 5 applies a variable torque to the engine 2 such that the affected output power of the engine 2 is transmitted by the differential gear mechanism 10, through the drive and driven gear wheels 16, 20 ultimately to the transmission 3 as a reactive force. The rotational force or output torque of the transmission 3 is further transmitted from the output shaft 3a to the drive wheels of the vehicle through the speed reduction gear 4.

At the same time, the controller 30 controls the power transducer 6 in response to a driver's instruction (i.e., an engine-starting instruction A or a vehicle starting-off instruction B), the rotational speed V of the transmission output shaft 3a representative of the travelling condition of the vehicle and the angle of rotation R of the third rotation shaft 1c. The output torque of the electric motor 5 is controlled by the controller 30 so as to charge the storage battery 7 at a desired rate, (FIG. 2,) so that the amount of torque transmitted to the transmission 3 is thereby controlled in a precise manner. Thus, the electric motor functions as a generator so that the output power of the motor 5 is utilized for charging the storage battery 7 through the power transducer 7.

Such control on the electric motor 5 by the power transducer 6 is generally exhibited in the related art and is well known to those skilled in the art. For example, it is described in detail in Japanese Patent Laid-Open No. 63-277499 and hence a further explanation is unnecessary.

Next, the operation of this embodiment at the time the engine as started will be described. First, it should be noted that the transmission 3 generally has at least three operating conditions as listed below:

1) a first condition in which the transmission 3 is in the parking range (P range) wherein the input shaft or the second rotation shaft 1b and the output shaft 3a of the transmission 3 are mechanically locked through the application of a brake or the engagement between gear wheels therein;

2) a second condition in which the transmission 3 is in the neutral range (N range) wherein the input shaft 1b and the output shaft 3a are free or disconnected with respect to each other; and 3) a third condition in which the transmission 3 is in the drive range (D range) wherein the speed change ratio or gear ratio thereof is automatically or manually changed from a high to a low ratio in response to the magnitude of a torque load applied to the output shaft 3a.

For example, when the engine 2 is started, it is first detected that the unillustrated key switch is in the engine starting position, and a signal indicative of this state is generated by the key switch or other appropriate means and fed to the controller 30 as an engine-starting command A. At the time of normal engine starting, the transmission 3 is generally in the parking range. Thus, when the input shaft 1b of the transmission 3 is in a locked position, the controller 30 determines that the engine 3 is to be started and operates to control the power transducer 6 so as to make the electric motor 5 function as a power source (i.e., a starter motor). Specifically, the controller 30 calculates the rotational speed of the electric motor 5 based on the angle of rotation R of the third rotation shaft 1c and, at the same time, controls the power transducer 6 so that electric power is supplied from the storage battery 7 to the electric motor 5, thus increasing the rotational speed of the motor 5 to a prescribed level (e.g., 200 rpm).

The output torque of the electric motor 5 is transmitted from the third rotation shaft 1c to the differential gear mechanism 10 through the gear wheels 25, 24. At the same time, the second rotation shaft 1b is blocked from rotation and the large-diameter drive gear wheel 16 is locked against rotation, so the rotative force of the second side gear wheel 12 transmitted from the electric motor 5 is further transmitted to the first rotation shaft 1a through the pinion gear wheels 13, 14 and the opposed first side gear wheels 11.

Accordingly, with the gear ratio of the gear wheel 25 to the gear wheel 24 being 2 for example, the unillustrated crank shaft of the engine 2 connected with the first rotation shaft 1a is caused to rotate at the rotational speed of about 100 rpm assuming, for example, that the rotational speed of the electric motor 5 is 200 rpm (see FIG. 2). If this engine starting condition continues for a few seconds, the engine 2 is started to run and enters into the idling operation so that the rotational speed of the crankshaft of the engine 2 increases up to about 500 through 800 rpm. At this time, as the transmission 3 remains in the parking range, the rotative force or torque of the engine 2 is transmitted to the electric motor 5 through the differential gear mechanism 10, thereby causing the third rotation shaft 1c to rotate at the speed of about 1000 through 1600 rpm.

When the controller 30 senses, based on the output signal R of the angle sensor 9 representative of the angle of rotation of the rotation shaft 1c of the motor 5, an increase in the rotational speed of the electric motor 5, it determines that the engine starting operation has been completed and stops the power supply to the electric motor 5. At the same time, the controller 30 controls the power transducer 6 so as to make the motor 5 function as a load for the rotation of the engine 2.

Accordingly, as the engine 2 begins to idle, the electric motor 5 begins to operate as a generator to charge the storage battery 7. At this time, almost all of the output torque of the engine 2 is transmitted to the electric motor 5 through the differential gear mechanism 10. In addition, the torque of the motor 5 acting as a load and the rotational speed thereof are controlled to be at such values as to not rotate the large-diameter gear wheel 16 connected with the second rotation shaft or input shaft 1b of the transmission 3.

Although the rotational speed of the engine 2 during idling is controlled to be at a prescribed level, fluctuations will occur due to variations in engine torque. Nonetheless, it is possible to offset the variations in engine torque and suppress fluctuations in the rotational speed of the engine 2 by finely controlling the output torque of the electric motor 5, as shown in FIG. 2. Such control on the output torque of the engine 2 by the power transducer 6 during idling is also described in detail in the aforementioned Japanese literature and hence no further description is made.

The case in which the vehicle is accelerated or started from a standstill will be described next. As the driver changes the unillustrated shift lever of the transmission 3 from the parking range to the drive range, the transmission 3 is released from locking so that torque can be transmitted from the second rotation shaft or the input shaft 1b to the output shaft 3a.

When the driver steps on the unillustrated accelerator pedal under this scenario, a vehicle starting-off command B in the form of a voltage signal having a magnitude proportional to the amount of depression of the accelerator pedal is generated and fed to the controller 30 which in turn controls the power transducer 6 so as to gradually increase the output torque or load torque of the electric motor 5. The load torque generated by the motor 5 is transmitted therefrom to the differential gear mechanism 10 through the gear wheels 25, 24, and further from the second side gear wheel 12 thereof to the pinion gear wheels 13, 14 as a reactive force.

Consequently, the pinion gear wheels 13, 14 are forced to move or rotate along the teethed outer peripheral surface of the second side gear 12, thus causing the large-diameter gear wheel 16 to rotate. As a result, the input shaft 1b of the transmission 3 begins to gradually rotate so that the vehicle runs with the speed thereof increasing in the manner as shown in FIG. 2.

Based on the output signal V of the speed sensor 8 representative of the rotational speed of the transmission output shaft 3a and the vehicle starting-off command B, the controller 30 controls the starting-off operation of the vehicle in a prescribed manner, i.e., it operates to move the vehicle off in a fast or slow manner in accordance with the extend to which the unillustrated accelerator pedal is depressed by the driver. More specifically the output torque and the rotational speed of the electric motor 5 are controlled in a feedback mode for the purpose of making the change rate of the increasing speed of the vehicle fall within the prescribed range.

Since the vehicle starting-off control is electrically performed as described above, freedom and accuracy in torque transmission are improved to a great extent while reducing resulting energy losses. Furthermore, there is no need to provide a separate engine starter and a separate generator, nor a separate hydraulic converter having a starting-off clutch function or a dry-type manual clutch, all of which are generally required with a conventional power transmission apparatus. This results in a reduction in size and manufacturing cost.

The above-described electrical control is, of course, applicable to the speed-changing operation of the transmission 3 as well as the vehicle starting-off operation.

Now, another aspect of the present invention will be described below in which the transmission 3 comprises a multi-stage transmission having a plurality of speed-change ranges or gear ratios and in which transmission torque can be controlled in an on-off manner in response to the manipulation of a shift lever by the driver.

In this case, a shift knob including a signal generator generating a shift lever operation signal (not shown) or other appropriate gear-ratio sensing means (not shown) for sensing the gear ratio of the transmission 3 is employed as a means for sensing the operation of a shift lever operated by the driver for changing the gear ratio of the transmission 3. The output signal of the shift knob or the gear-ratio sensing means is input to the controller 30 as a signal representing the travelling condition of the vehicle.

The shift knob is generally employed with a semi-automatic transmission and generates an output signal in the form of a speed-changing operation signal when the driver manipulates the shift lever.

The gear-ratio sensing means is generally employed with an automatic transmission and includes a movable contact which is operatively connected with a movable portion of a shift lever for generating an output signal in the form of an electric signal corresponding to the operating position of the shift lever. In the case of a three-stage transmission having three gear ratios, the output signal of the gear-ratio sensing means comprises, for example, six on-off signals respectively corresponding to a first speed gear range, a second speed gear range, a third speed gear range, the neutral gear range, the parking gear range and the reverse gear range.

Next, the operation of the above embodiment in which the operation detecting means comprises a shift knob will be described in detail with reference to FIG. 1 and the wave form diagrams shown in FIGS. 2 and 3.

When the driver shifts the shift lever of the transmission 3 from the parking position to the first speed position, the transmission 3 transmits torque from the input shaft 1b to the output shaft 3a. Subsequently, when the driver steps on the acceleration pedal in this state, a vehicle starting-off command B is input in to the controller 30 which operates to increase the torque generated by the electric motor 5 in a gradual manner, as shown in FIG. 2, thus making the vehicle move off smoothly.

The control program stored in the controller 30 is designed so that the controller 30 determines the vehicle to be in a starting-off operation when the vehicle speed is less than about 7 or 8 Km/h, and alters the rate of change in the torque generated by the electric motor 5 with respect to time in accordance with the extend or amount of depression of the accelerator pedal by the driver. As a result, varying vehicle starting-off operations ranging from slow starting to rapid starting can be performed by the driver's accelerator pedal operation without generating frictional energy loss of a mechanical nature.

When the gear ratio is to be changed from the first speed to the second speed range with the vehicle speed being increased to a certain level, the driver typically has to shift from the first to the second speed range through the neutral range. Upon shifting a signal generator in the shift knob generates a gear shift signal to the controller 30 which momentarily interrupts, in synchronizations therewith, the transmission of torque between the engine 2 and the transmission 3 and then acts to control the electric motor 5 so as to reconnect them. The gear shift signal is generated by a contact-type switch which is opened and closed by the force or movement of the shift knob; it becomes high in the neutral range of the shift lever during the movement of the shift lever. The gear shift signal indicates the rotational speed V of the road wheels as well as the travelling condition of the vehicle. Referring to FIG. 3, the central portion of the gear shift signal designated by the broken line during the high level thereof corresponds to the condition in which the transmission is in the neutral range with the torque to be transmitted being zero.

Figure 3:
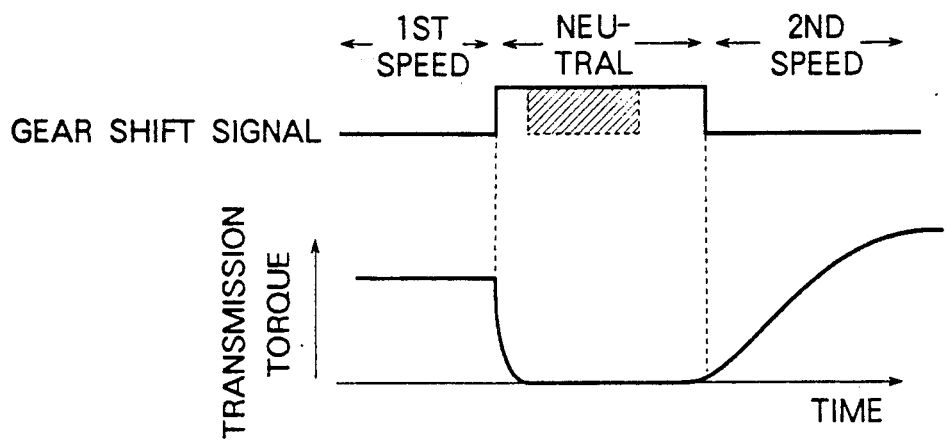
FIG. 3 is a wave form diagram showing the operation of another embodiment of the present invention.
Figure 4:
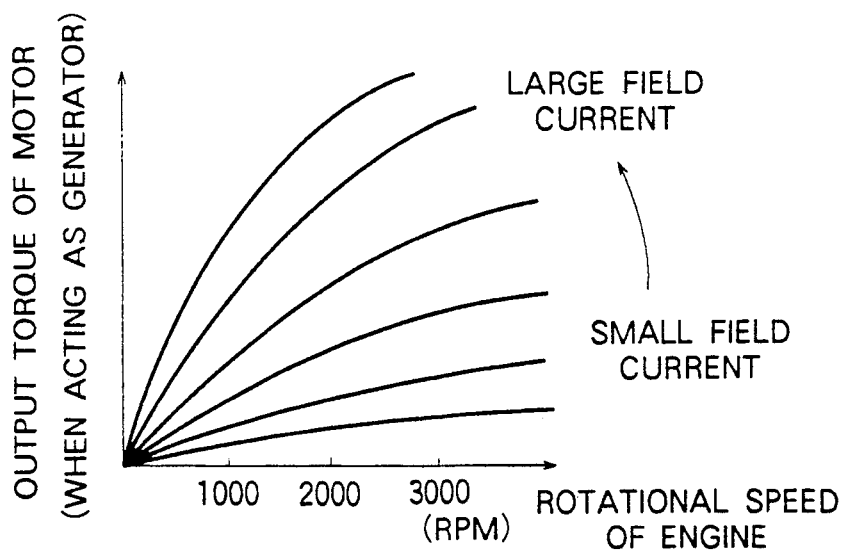
FIG. 4 is a characteristic view of torque generated by an electric motor.

The controller 30 changes, in synchronization with the input of a gear shift signal, the torque to be transmitted from the engine 2 to the transmission 30 in the manner shown in FIG. 3. More specifically, the rate of change in the transmission torque is great in the case of decreasing the transmission torque at a rising point of the gear shift signal whereas it is small in the case of increasing the transmission torque at a falling point of the gear shift signal. Such a change in the transmission torque results in a corresponding change in the torque generated by the electric motor 5 without causing significant energy loss. Accordingly, the transmission torque is converted into the generated torque of the electric motor 5 without any substantial variation though there is some change in scale or magnitude.

A concrete method of changing the torque generated by the electric motor 5 is described in Japanese Patent Laid-Open No. 63-2777499. A much simpler example would be to take the field current of the motor 5 as one of control parameters and control it in an increasing or decreasing manner with the lapse of time. By changing the generation torque of the electric motor 5 in synchronization with a shift in the operating range of the shift lever or a gear ratio changing operation, the transmission of torque from the engine 2 to the transmission 3 is controllably interrupted or retransmitted so that shocks due to the torque transmission can be suppressed in an effective manner.

Figure 5:
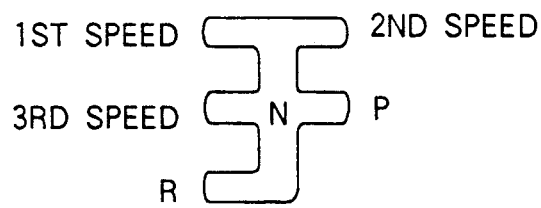
FIG. 5 is an explanatory view showing various operating positions of a shift lever.

FIG. 5 shows six operating positions of the shift lever. The transmission 3 has three speed stages or gear ratios including the first through the third speed as well as neutral, parking and reverse.

Figure 6:
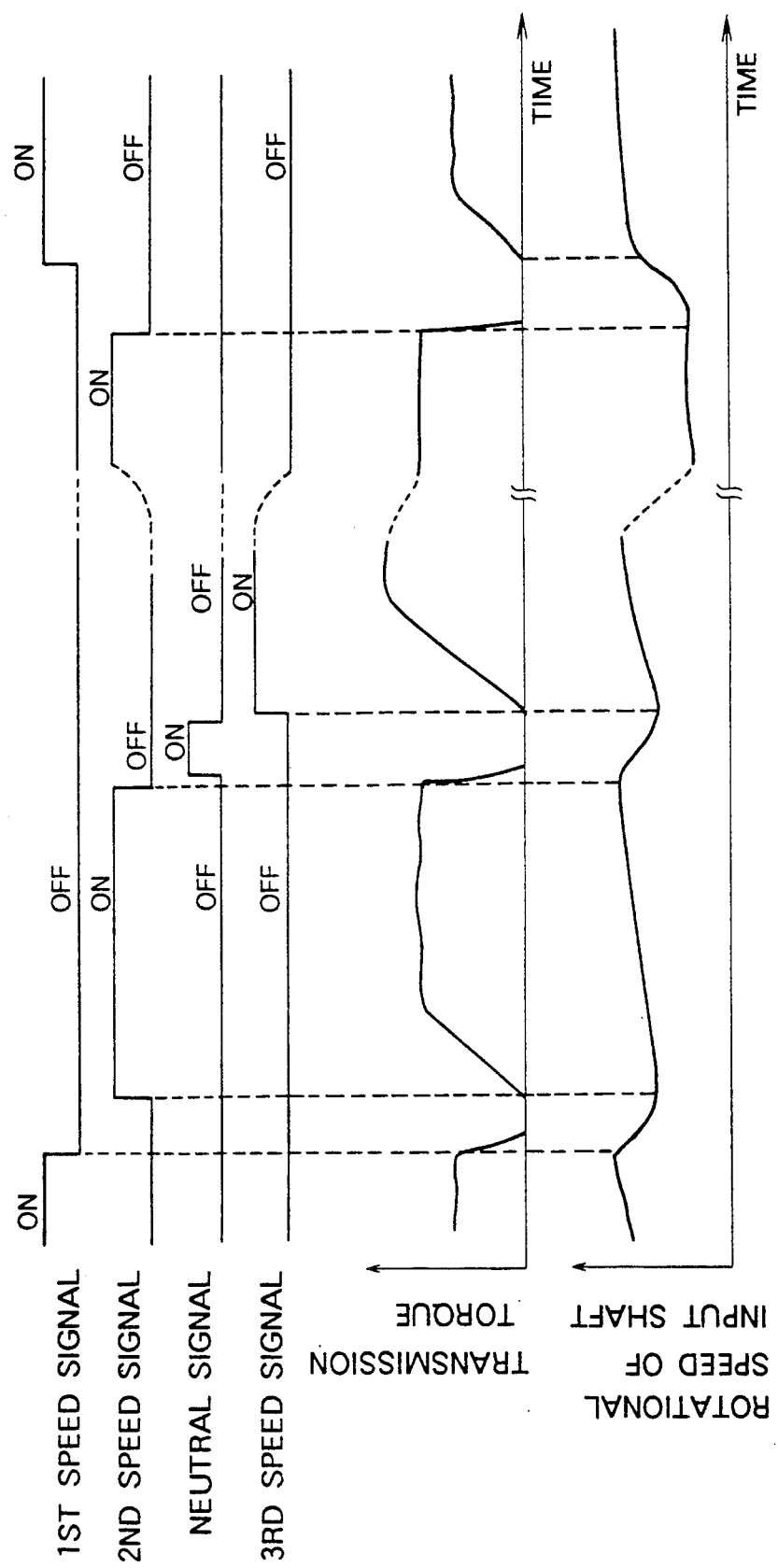
FIG. 6 is a wave form diagram showing the operation of a further embodiment of the present invention.

FIG. 6 is a wave form diagram showing the operational timings of the present apparatus, i.e., on-off signals corresponding to the first through the third speeds and the neutral range, the transmission torque to the transmission 3 which corresponds to the torque generated by the electric motor 5 and which is controlled to be interrupted or transmitted depending on the on-off signals and the rotational speed of the input shaft 1b of the transmission 3.

First, the gear ratio detecting means detects the operating or engaging condition of the transmission 3 and generates an output signal indicative of the detected gear ratio to the controller 30.

When the gear ratio is changed from the first speed to the second speed, the shift lever is operated to move from the first speed position to the second speed position without passing the neutral position, as clearly shown in FIG. 5. This change is determined to be an up shift through a change in the first speed signal (i.e., falling thereof).

Subsequently when the gear ratio is changed from the second speed to the third speed, the shift lever passes the neutral position so that a neutral signal is generated during the time starting from the falling edge of the second speed signal and terminating in the rising edge of the third speed signal. As a result, the change in the gear ratio is determined to be an up shift.

At the time of such up shifting, the controller 30 controls the torque generated by the electric motor 5 so as to reduce the rotational speed of the input shaft 1b at the instant immediately after the change in the gear ratio. At this time, the controller 30 controls, during the time from the start of interruption of the torque to the reconnection or retransmission thereof, the rotational speed of the input shaft 1b in such a manner that there will be no substantial difference in the rotational speed of the input shaft 1b developed before and after the gear change.

Furthermore, when the gear ratio is reduced from the second speed to the first speed, there is no neutral signal generated during the gear ratio changing operation, so it is determined to be a down shift and not an up shift. In this scenario, the controller 30 controls the generation torque of the electric motor 5 so that the rotational speed of the input shaft 1b immediately after the gear ratio change increases to a value greater than that immediately before the change. Accordingly, the controller 30 calculates a target rotational speed of the input shaft 1b based on the rotational speed V of the output shaft 3a as sensed by the speed sensor 8, and the detection signal indicative of the changed gear ratio. In order to make the rotational speed of the input shaft 1b approach the target speed, the controller 30 controls the electric motor 5 so that the torque generated by the motor 5 becomes a load or an output power. If the rotational speed of the engine 2 during the gear ratio changing operation is supposed to be constant, the rotational speed of the input shaft 1b of the transmission 3 can be calculated based on the rotational speed of the electric motor 5, which is sensed as the rotational angle R by the angle sensor 9, and the gear ratio of the differential gear mechanism 10, or it can also be directly detected by an unillustrated speed sensor.

In this manner, the torque generated by the motor 5 is changed in synchronization with the change in the operational position of the shift lever (i.e., gear ratio changing operation) so that the torque transmitted from the engine 2 to the transmission 3 is accordingly controlled in an on-off manner. Further, during the time from the interruption of the toque transmission until the restarting thereof, the rotational speed of the input shaft 1b can be controlled in dependence upon the changed gear ratio so that there will not be a significant difference in the rotational speed thereof before and after the gear changing.

In the embodiment described above, the motor 5 acts as a generator during the starting-off of the vehicle. Nonetheless, it may also serve as a power source for increasing the output torque of the transmission.

The differential gear mechanism 10 described above is constituted by bevel gears 11, 12, pinion gear 13, 14, the U-shaped pinion shaft 15 and the large-diameter gear wheel 16, with the first through third rotation shafts 1a through 1c being arranged in a manner as shown in FIG. 1. Nonetheless, the differential can be constructed or arranged otherwise. For example, a well-known planetary gear mechanism of a compact construction having a plurality of coaxial shafts can be employed without any problem.

Although the rotational force transmission means 1 is illustrated as having three rotation shafts, a plurality of similar planetary gears can be used in combination to provide a rotational force transmission means with more than three rotation shafts.

What is claimed is:

1. A vehicle power transmission apparatus having a starter function comprising:
    torque transmitting means including a differential gear mechanism and having at least a first, a second and a third rotation shaft;
    an engine operatively connected with said first rotation shaft of said torque transmitting means;
    a transmission connected with said second rotation shaft for transmitting torque to a drive shaft of a vehicle;
    an electric motor connected with said third shaft of said torque transmitting means;
    a power transducer for converting said electric motor from operating as a power source to operating as a generator;
    a controller for controlling said power transducer in such a manner that said electric motor operates as a power source for starting said engine or as a generator for applying a variable load to said engine through said differential so as to variably control the torque applied by said engine to said drive shaft; and,
    an electric power source for supplying power to said electric motor through said power transducer.

2. A vehicle power transmission apparatus according to claim 1, wherein said controller controls said power transducer so as to operate said electric motor as a power source for starting said engine when said second rotation shaft of said transmitting means is locked against rotation and when said engine is being started.

3. A vehicle power transmission apparatus according to claim 1, wherein said transmission has a plurality of operational positions, and wherein said controller controls said power transducer in such a manner that the torque of said electric motor varies in synchronization with a change in the operational position of said transmission to perform an on-off control on the transmission of torque from said engine to said transmission.

4. A vehicle power transmission apparatus according to claim 1, wherein said torque is transmitted from said engine to said transmission through said differential.

* * * * *